June 19, 1962    G. R. WOOD ET AL    3,039,792
MOTORCYCLE STAND
Filed July 11, 1960    3 Sheets-Sheet 1
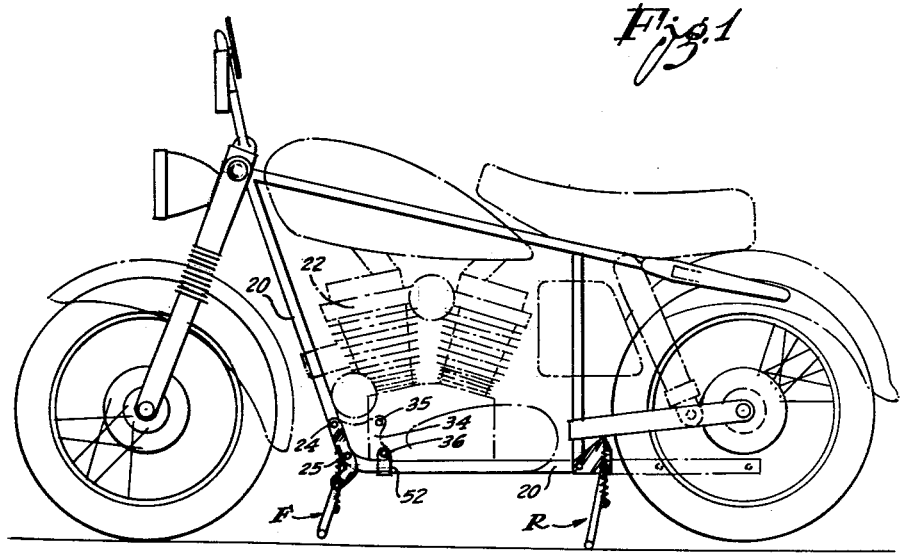
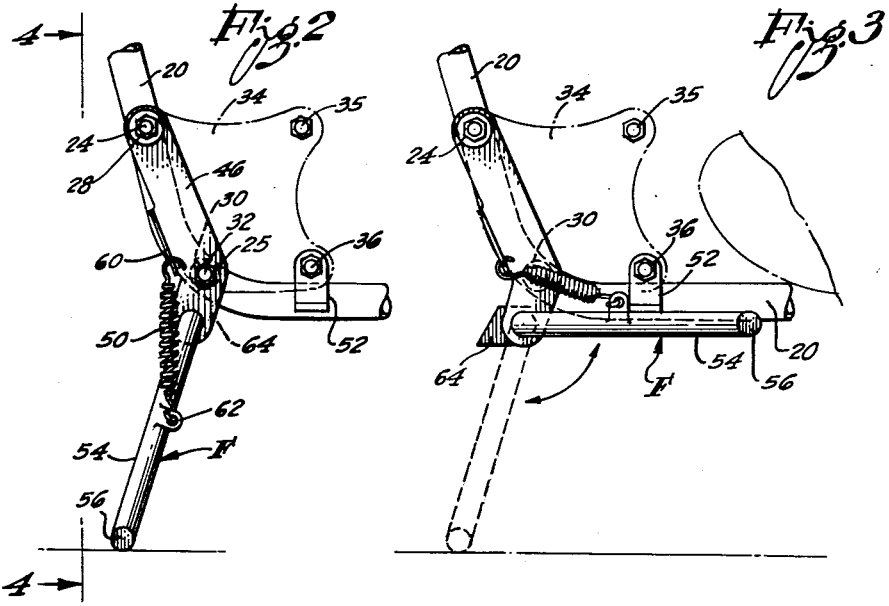
INVENTORS:
George R. Wood
James I. Tone
Attorneys.

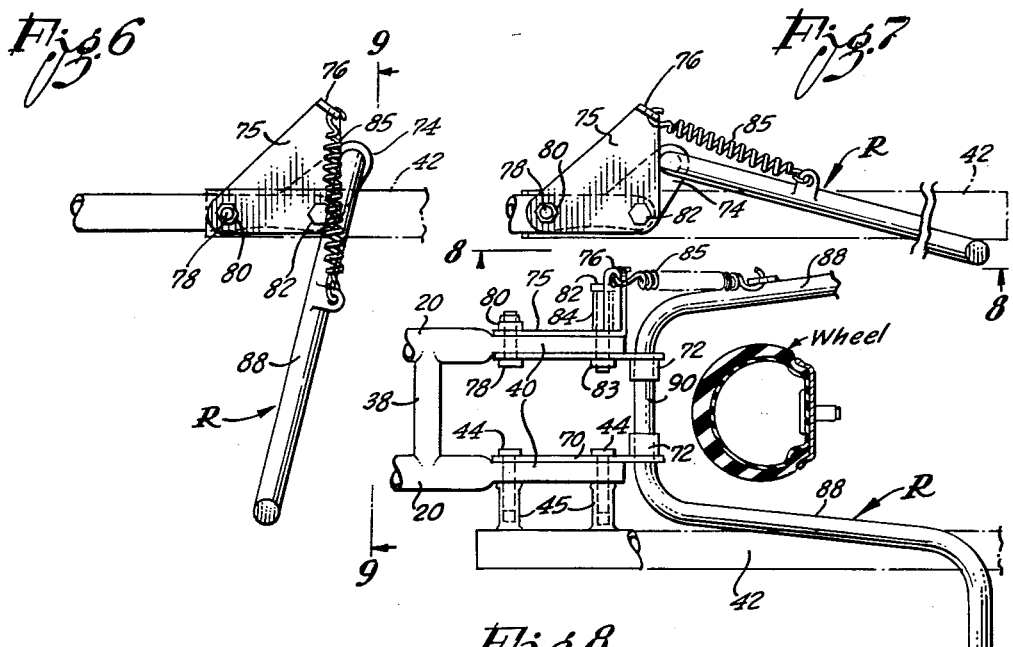

June 19, 1962　　　G. R. WOOD ET AL　　　3,039,792
MOTORCYCLE STAND
Filed July 11, 1960　　　　　　　　　　　　3 Sheets-Sheet 3
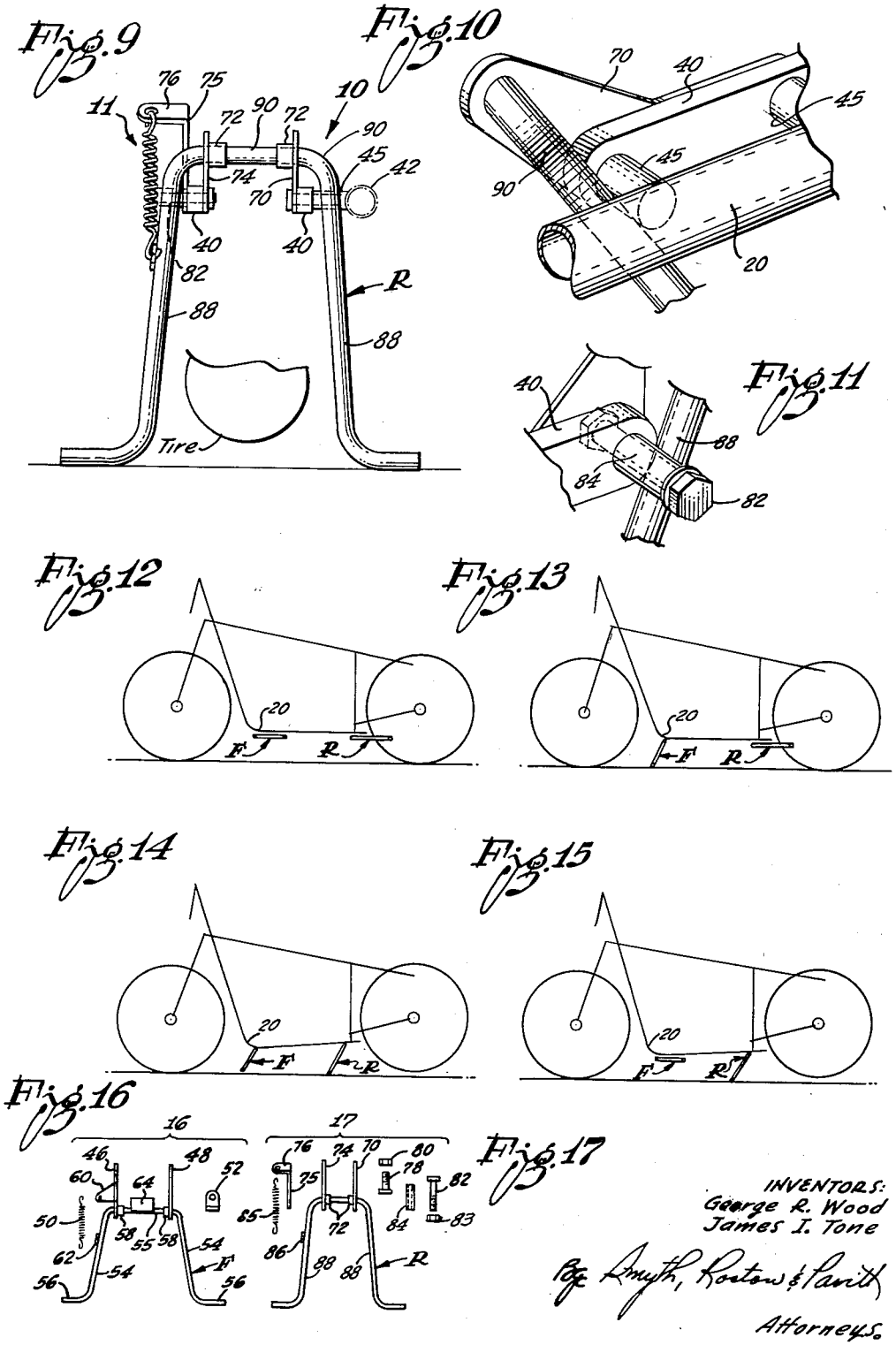
INVENTORS:
George R. Wood
James I. Tone
Attorneys United States Patent Office 3,039,792
Patented June 19, 1962

1

3,039,792
MOTORCYCLE STAND
George R. Wood, 7540 W. 91st St., Los Angeles 45, Calif., and James I. Tone, 824 E. Hyde Park Blvd., Inglewood, Calif.
Filed July 11, 1960, Ser. No. 42,088
3 Claims. (Cl. 280—302)

This invention relates to a stand for a motorcycle, which stand is pivotally mounted on the motorcycle to swing from a normal upper retracted position to a lower effective position to elevate one end of the motorcycle and to maintain the motorcycle upright in a stable manner. At its lower effective position, the stand is inclined rearward in abutment against a fixed stop on the motorcycle so that pushing the elevated motorcycle forward results in the stand being swung away from the stop towards its retracted position, the retraction being accomplished by means of a spring.

While a stand of the character disclosed herein may be included in the factory fabrication of a motorcycle, an advantage of the invention is that the stand may be sold in the form of a kit to be assembled onto an existing motorcycle. A feature of the invention is that it takes advantage of whatever existing structure on a motorcycle is available to cooperate with the stand. Thus, the stand of the invention is constructed to pivot at the location of an existing bolt on the motorcycle so that the existing bolt or a substituted longer bolt may serve as the pivot for the stand. Applying the same principle, the stand employs a structural part of the motorcycle for the stop against which the stand abuts at its effective position. These features make it possible to assemble such a stand to an existing motorcycle with minimum additional parts and without modifying the structure of the motorcycle.

The stand of the invention may be mounted either on the front end or the rear end of the motorcycle. The present disclosure teaches that two such stands may be employed, one to lift the front wheel from the ground and the other to lift the rear wheel from the ground.

The features and advantages of the invention may be understood by reference to the following detailed description considered with the accompanying drawings.

In the drawings, which are to be regarded as merely illustrative:

FIG. 1 shows a well-known type of motorcycle with a forward stand and a rear stand thereon, both of the stands being shown in their lower rearwardly inclined effective positions and both of the stands being constructed in accord with the teachings of the invention;

FIG. 2 is an enlarged fragmentary side elevational view showing the front stand in its lower effective position;

FIG. 3 is a similar view showing the front stand in its upper retracted position;

FIG. 4 is a front elevation of the front stand in its lower effective position;

FIG. 5 is a fragmentary perspective view showing how a stop body on the stand abuts a structural part of the motorcycle at the effective position of the front stand;

FIG. 6 is a fragmentary side elevational view showing the rear stand in its lower effective position;

FIG. 7 is a similar view showing the rear stand in its upper retracted position;

FIG. 8 is a fragmentary view showing the retracted stand from below as seen along the line 8—8 of FIG. 7;

FIG. 9 is a front elevation of the rear stand in its lower effective position;

FIG. 10 shows in perspective a portion of the rear stand viewed as indicated by the arrow 10 in FIG. 9, the view showing how one of the two legs of the stand abuts as a stop a lateral projection of a muffler of the motorcycle;

FIG. 11 shows in perspective another portion of the rear

2 stand viewed as indicated by the arrow 11 in FIG. 9, the view showing how the other leg of the stand may abut as a stop a bolt mounted in an existing bolt hole in the motorcycle structure;

FIG. 12 is a diagrammatic side elevational view of the motorcycle with both stands up;

FIG. 13 is a similar view with the front stand down and the rear stand up;

FIG. 14 is a similar view with both stands down;

FIG. 15 is a similar view with the rear stand down and the front stand up;

FIG. 16 is an exploded view of the parts of a kit for providing a motorcycle with the front stand; and FIG. 17 is a similar exploded view of the parts of a kit for providing the motorcycle with the rear stand.

FIG. 1 shows a well-known type of motorcycle equipped with a front stand, generally designated F, and a rear stand, generally designated R, both stands exemplifying the invention. The motorcycle has the usual frame structure which includes a pair of spaced longitudinal frame members 20 (FIG. 4) which support the motorcycle engine 22 and extend rearward beyond the motorcycle engine. As shown in FIG. 4, the two tubular frame members 20 at the lower front portion of the frame are interconnected by an upper bolt 24 and a lower bolt 25, the upper bolt carrying a spacer sleeve 26 and a nut 28, and the lower bolt carrying a spacer sleeve 30 and a nut 32. The means for anchoring the engine 22 to the motorcycle frame includes a bracket plate 34 which lies against one of the frame members 20 and is apertured for anchorage by the two bolts 24 and 25. In addition, the bracket plate 34 has an upper aperture to receive a bolt 35 and a lower aperture to receive a bolt 36, the last two bolts anchoring the engine to the bracket plate.

As shown in FIG. 8, the two frame members 20 at the lower rear portion of the frame are integrally interconnected by a tubular element 38 and each of the frame members has an integral rearwardly extended bracket arm 40. The purpose of the two bracket arms 40 is to support corresponding mufflers if desired. For this purpose, each of the bracket arms 40 has two spaced apertures to receive mounting screws. FIG. 8 shows a muffler 42 mounted on one of the bracket arms 40 by a pair of cap screws 44. The muffler 42 has a pair of integral tubular lateral extensions 45 that are internally threaded for engagement by the cap screws 44. All the structural members described to this point are part of the factory construction of a motorcycle.

The front stand F, which is shown in FIGS. 1 to 5, may be sold in the form of a kit that is shown in FIG. 16. The kit shown in FIG. 16 includes a bracket plate 46, a bracket plate 48, a coil tension spring 50, an angular clip 52 and a stand member in the form of an inverted U having a pair of legs 54 and an intermediate portion 55, each of the legs at its lower end being bent to form a foot portion 56. Each of the two bracket plates 46 and 48 is provided with a bushing 58 fixed thereto to journal the intermediate portion 55 of the stand member.

Each of the two bracket plates 46 and 48 is of elongated angular configuration as indicated in FIG. 2 and each is provided with an aperture to receive the upper bolt 24 and a second aperture to receive the lower bolt 25. The bracket plate 46 is formed with a laterally extending apertured ear 60 for hook engagement with one end of the coil spring 50 and one of the legs 54 of the stand member is provided with an apertured ear 62 for hook engagement with the other end of the spring.

Welded to the intermediate portion 55 of the stand member is what may be termed a stop block 64. As best shown in FIG. 5, the stop block 64 is of relatively long dimension axially of the intermediate portion 55 and is formed with an inclined face 65 to abut the spacer sleeve 30 on the bolt 25 when the stand is at its lower rearwardly inclined effective position.

At the upper retracted position of the front stand F, one of the legs 54 abuts the angular clip 52 of the kit, as shown in FIG. 3. The angular clip 52 is apertured for mounting on the lower bolt 36 that anchors the engine to the bracket plate 34.

It is a simple matter to assemble the parts of the kit shown in FIG. 16 to the motorcycle to provide the motorcycle with the front stand F. With the intermediate portion 55 of the stand member journaled in the bearing bushings 58, it is a simple matter to loosen the two nuts 28 and 32 in FIG. 4 for temporary withdrawal of the two bolts 24 and 25 to permit the two bracket plates 46 and 48 to be anchored by two bolts. The angular clip 52 is then mounted on the previously mentioned lower bolt 36 in the manner shown in FIGS. 2 and 3. One end of the coil spring 50 is then hooked into engagement with the ear 60 of the bracket plate 46 and the other end of the spring is hooked into engagement with the ear 62 on one of the legs 54 of the stand member.

As may be seen in FIGS. 2 and 3, the location of the connections of the spring 50 with the two ears 60 and 62 are such that the spring swings past center when the stand member is moved between its lower effective position shown in FIG. 2 and its upper retracted position shown in FIG. 3. Thus, in FIG. 2 the spring 50 is on one side of the pivot axis of the stand member to exert force for holding the stop block 64 of the stand member against the spacer sleeve 30 of the motorcycle structure. When the stand member is swung from the lower effective position shown in FIG. 2 to the upper retracted position shown in FIG. 3, the spring 50 passes to the other side of the pivot axis of the stand member and in its new position exerts a force to hold the stand member against the angular clip 52. The angular clip 52 keeps the retracted stand member low enough for the rider to engage the stand by his foot to force the stand to its lower effective position. It is apparent that if the stand member is moved from one of the two positions past the pivot axis of the stand member, the spring 50 will snap the stand member to its other position.

It is apparent that the front stand F alone may be lowered whenever desired, as shown in FIG. 3, to hold the motorcycle upright in a stable manner for servicing or for lifting the front wheel from the ground for changing the front tire. When the front end of the motorcycle is so elevated, the front stand F may be retracted simply by pushing the motorcycle forward to cause the front stand to rotate past center whereupon the spring 50 completes the retraction movement. If desired, the motorcycle rider may simply start the engine and ride the motorcycle off the front stand.

The rear stand R shown in FIGS. 1 and 6–11 may be sold in the form of a kit that is illustrated in FIG. 17. The kit shown in FIG. 17 includes a bracket plate 70 provided with a bearing bushing 72, a bracket plate 74 provided with a similar bushing 72, a third bracket plate 75 formed with a bent apertured ear 76, a bolt 78 with a nut 80, a bolt 82 with a nut 84, and a coiled tension spring 85. The spring 85 makes hook engagement with the apertured ear 76 and at its other end makes hook engagement with an apertured ear 86 on one of the two legs 88 of a stand member. The stand member is of the usual configuration of an inverted U and has two legs 88 interconnected by an intermediate portion 90.

Each of the two bracket plates 70 and 74 is of the same general angular construction as the previously described bracket plates 46 and 48 and each is provided with a pair of apertures to register with the two bolt holes in each of the previously mentioned bracket arms 40 on the rear end of the motorcycle frame. To mount the bracket plate 70 on the motorcycle, the two capscrews 44 that secure the muffler 42 as shown in FIG. 8 are temporarily withdrawn and replaced to hold the bracket plate against the inner side of the corresponding bracket arm 40.

Since the motorcycle chosen for illustration of the invention does not have a muffler attached to the other bracket arm 40, the two bolts 78 and 82 of the kit are used in the manner shown in FIG. 8 to attach the bracket plate 74 to one side of the bracket arm 40 and to attach the third bracket plate 75 to the other side of the bracket arm in alignment with the bracket plate 74. The nut 80 is screwed onto the bolt 78. The bolt 82 with the spacer sleeve 84 thereon is mounted as shown in FIG. 8 and secured by the nut 83. The spring 85 is then hooked into engagement with the ear 76 of the bracket plate 75 and with the ear 86 of one leg 88 of the stand member.

At the rearwardly inclined lower effective position of the rear stand R shown in FIGS. 1 and 6, the spring 85 is on one side of the pivot axis of the stand member to pull the stand member against two stops on opposite sides of the motorcycle frame. As shown in FIG. 10, one of the stops is the rearmost lateral extension 45 of the muffler 42. As shown in FIG. 11, the other stop is the spacer sleeve 84 on the bolt 82. When the rear stand R is swung upward and rearward from the effective position shown in FIG. 6 to the upper retracted position shown in FIG. 7, the spring 85 swings to the other side of the pivot axis of the stand member to pull the stand member against the underside of the muffler 42, the muffler serving as a stop. Thus, the spring 85 acts to pull the stand member to either of its two opposite positions with a snap action.

The diagrammatic FIG. 12 shows both of the stands F and R in their normal retracted positions. FIG. 13 shows the front stand F supporting the front end of the motorcycle with the front wheel elevated sufficiently above ground level to permit the front tire to be changed. FIG. 15 shows the rear stand R in its lower effective position and the front stand F in its upper retracted position, the rear stand elevating the rear end of the motorcycle to lift the rear wheel sufficiently to permit the rear tire to be changed. If both of the stands are in their lower effective positions as shown in FIGS. 1 and 14, the front stand F is held above ground level by the front wheel.

Our description in specific detail of the selected embodiments of the invention will suggest various changes, substitutions and other departures from our disclosure within the spirit and scope of the appended claims.

We claim:

1. A retractable stand for mounting on a motorcycle to support the motorcycle upright with one of the two wheels of the motorcycle spaced above ground level, comprising: a stand member in the form of a rod of the configuration of an inverted letter U with two legs to swing downward and forward from a first upper rearward retracted position to a second lower rearwardly inclined effective position for supporting the motorcycle; a plurality of brackets for mounting on the motorcycle including a pair of bracket plates with corresponding coaxial bushings journaling said stand member, each of said bracket plates having two spaced apertures to receive screw means for fixedly anchoring the bracket plate on the motorcycle, one of said plurality of bracket plates having a laterally extending ear; stop means to limit the downward forward swinging movement of the stand member at said second position, said stop means being a metal block unitary with said stand member on the portion thereof between said two bushings to rock about the axis of the bushings and to abut a part of the motorcycle at said second position of the stand member, said metal block being of extensive dimension along the axis of the two bushings for extensive contact with said part of the motorcycle; and a tension spring connected at one end to said ear and at the other end to one of said legs, the points of connection of the spring with the ear and leg being positioned for the spring to swing past center as the stand member swings between said two positions whereby the spring yieldingly holds the stand member at either of said two positions.

2. A retractable stand for mounting on a motorcycle adjacent a transverse member of the motorcycle to support the motorcycle upright with one of the two wheels of the motorcycle spaced above ground level, comprising: a stand member of the configuration of an inverted letter U with two legs to swing downward and forward from a first upper rearward retracted position to a second lower rearwardly inclined position for supporting the motorcycle; a pair of brackets having apertures matching bolt holes on the motorcycle for attachment to the motorcycle by means extending through the bolt holes, each of said brackets having a bearing bushing for journaling said stand member, one of said brackets having a laterally extending apertured ear; a tension spring to connect said ear with one of the legs of the stand member; and a metal block welded to said stand member to rock about the pivot axis of the stand member in position to abut said transverse member of the motorcycle as a stop at said second position of the stand member, the points of connection of the spring with the ear and the leg being positioned for the spring to swing past center as the stand member swings between said two positions whereby the spring yieldingly holds the stand member at either of said two positions.

3. A retractable stand for mounting on a motorcycle to support the rear end of the motorcycle in the region of a pair of rearwardly extending bracket arms of the motorcycle, each of the bracket arms having a pair of apertures, there being a muffler mounted on one of said bracket arms with a lateral tubular extension of the muffler engaged by screw means extending through one of the apertures in the arm, said stand comprising: a stand member of the configuration of an inverted letter U with two legs to swing downward and forward from a first upper rearward retracted position to a second lower rearwardly inclined effective position for supporting the motorcycle; two brackets for mounting on the inner sides of said bracket arms, each of said brackets having apertures to match the apertures of the corresponding bracket arm, each of said two brackets having a bearing bushing to journal the stand member; a third bracket having apertures to match the apertures of the bracket arms for mounting on the outer side of one of said bracket arms on the opposite side of the motorcycle from said muffler in alignment with said first mentioned two brackets, said third bracket being formed with a lateral ear, each of the first two mentioned brackets being of angular configuration to pivot the stand member in a position for the stand member to abut said lateral extension of the muffler as a stop at said second lower position of the stand member; and a spring connecting said ear of the third bracket with one of said legs, the points of connection of the spring with the ear and leg being positioned for the spring to swing past center as the stand member swings between said two positions whereby the spring yieldingly holds the stand member retracted at its first position or alternately holds the stand member at its second position against said lateral extension of the muffler.

References Cited in the file of this patent

UNITED STATES PATENTS

| | | |
|---|---|---|
| 1,124,109 | Conover | Jan. 5, 1915 |
| 1,584,096 | Henderson | May 11, 1926 |
| 2,791,441 | Phillips | May 7, 1957 |

FOREIGN PATENTS

| | | |
|---|---|---|
| 11,734 | Denmark | of 1909 |
| 127,174 | Sweden | of 1950 |
| 471,513 | Germany | of 1929 |